INVENTORS
Albert Kindelmann.
Ewald Boecking.
BY
ATTORNEYS

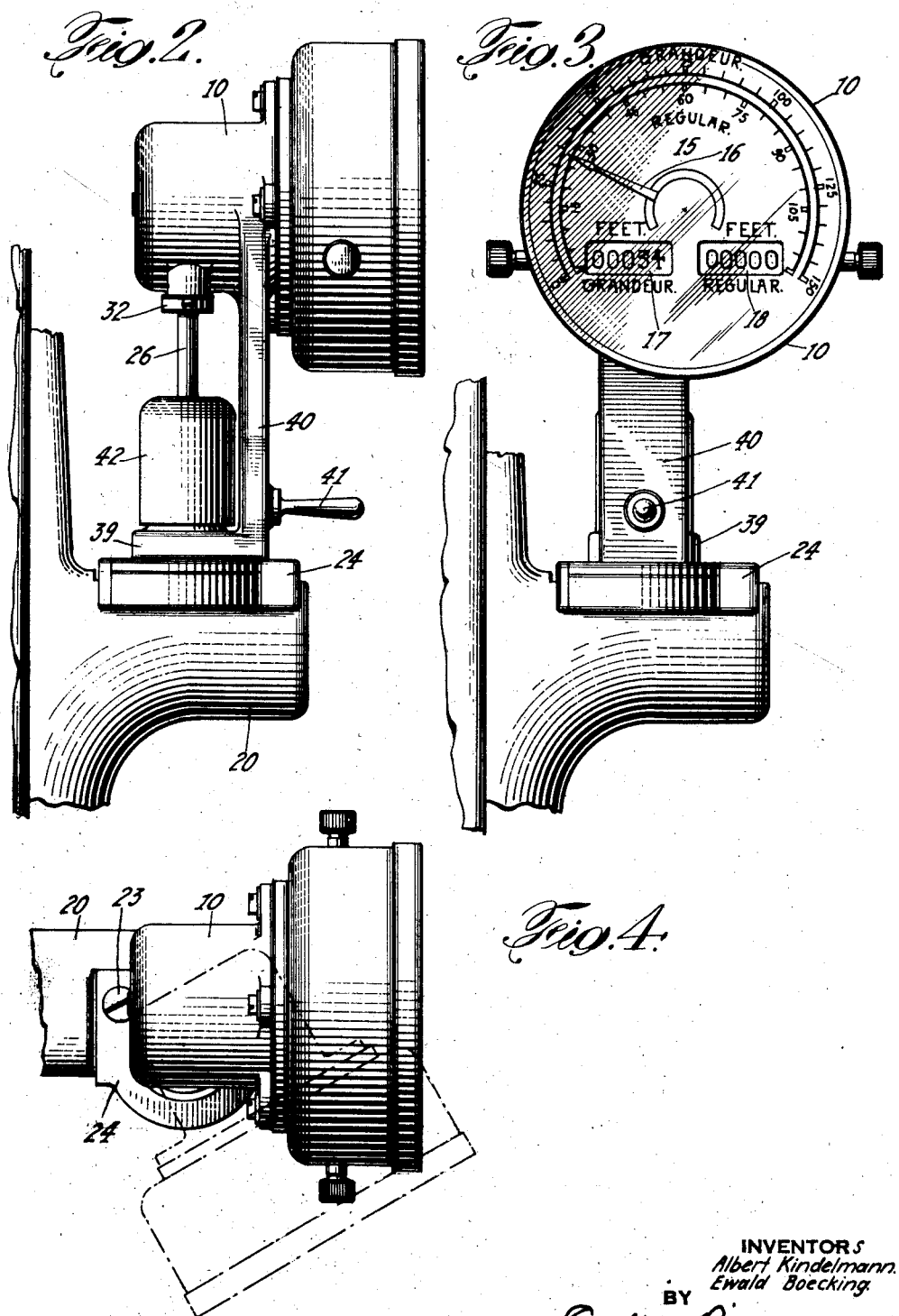

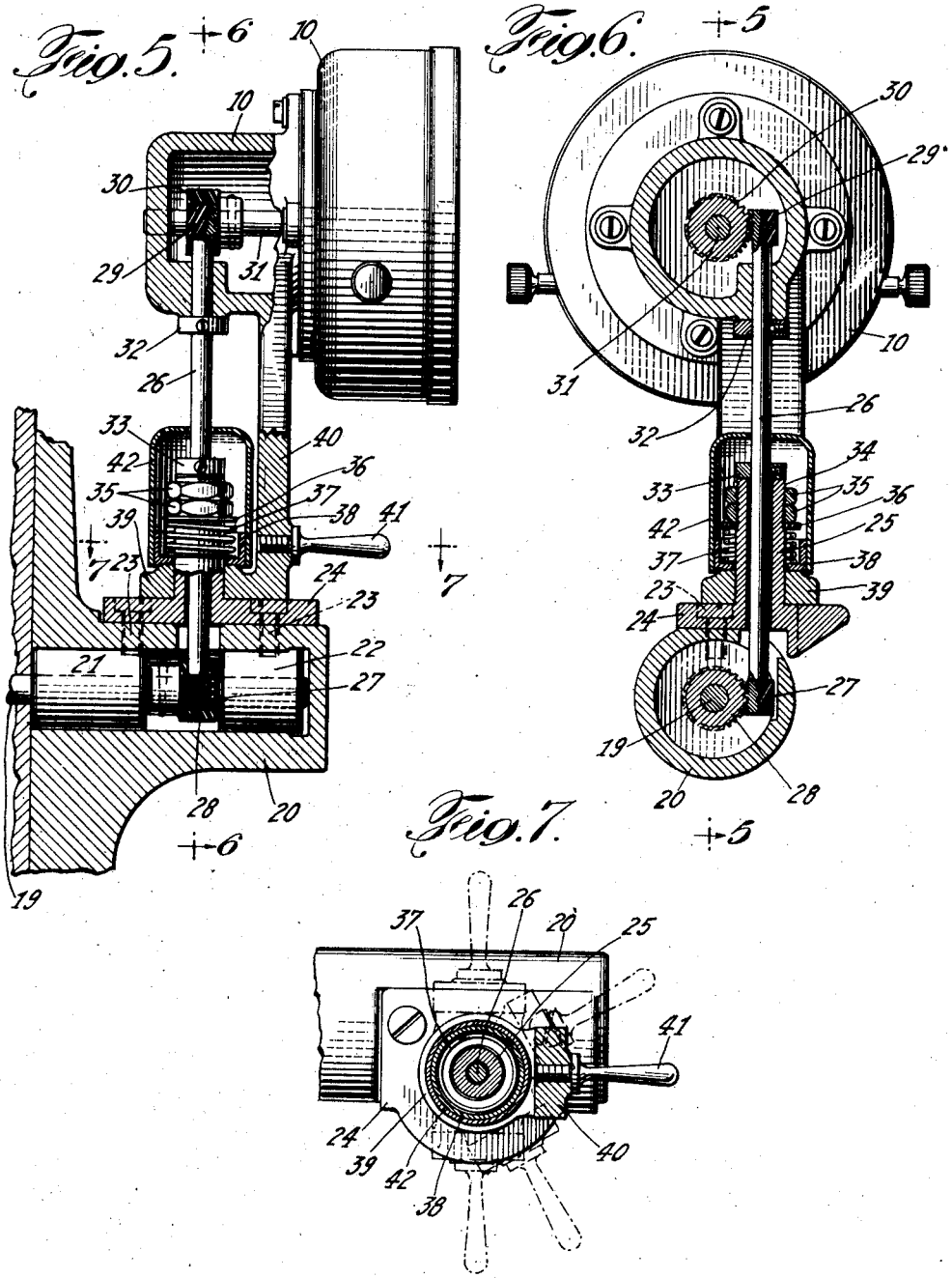

May 1, 1934.   A. KINDELMANN ET AL   1,957,172
SPEED AND FOOTAGE INDICATOR FOR MOTION PICTURE MACHINES
Filed Feb. 28, 1931   4 Sheets-Sheet 4

Inventors
Albert Kindelmann.
Ewald Boecking.
By their Attorneys
Austin & Dix

Patented May 1, 1934

1,957,172

UNITED STATES PATENT OFFICE 1,957,172

SPEED AND FOOTAGE INDICATOR FOR MOTION PICTURE MACHINES

Albert Kindelmann, Floral Park, and Ewald Boecking, Brooklyn, N. Y., assignors to International Projector Corporation, New York, N. Y., a corporation of Delaware Application February 28, 1931, Serial No. 519,082

4 Claims. (Cl. 88—16)

This invention relates to indicators and has special reference to indicators which indicate both speed and total amount of travel of film through a motion picture machine.

A main object of the invention is to provide a simple, durable, compact and efficient speed and footage indicator which may be disposed on an apparatus and is adjustable with ease and adapted to enable a workman to view the force of the indicator from any angle by a simple manipulation of the indicator on its mount.

A further object is to provide a simple and efficient construction whereby an improved form of indicator is provided and is adjustable to readily be moved to a desirable position by merely turning the handle thereon without in the least effecting the efficiency and operation of the device while the same is running.

Further and more specific objects, features and advantages will more clearly appear from a consideration of the specification hereinafter taken in connection with the accompanying drawings which form part of the specification and which illustrate a present preferred form of the invention.

In general terms, the invention comprises an indicator mounted on an apparatus and connected with one of the main drive shafts thereof to indicate the speed and total amount of travel of the apparatus with especial reference to the speed and total amount of travel of a motion picture film through a camera or projector. The indicator is mounted to swivel around an axis, preferably the axis of an indicator drive shaft so that it can be turned by simple manipulation of a hand to present the dial in most any direction to be observed by the operator at any convenient angle in any position and at any time. The construction is such that the axis around which the indicator is swung coincides with the indicators of the drive shaft so the adjustability of the indicator will not in any way interfere with the continuous operation of it. This sort of device is especially adaptable and useful in connection with modern projectors where the operator may have a phonograph system for the production of sound, which must be maintained in absolute synchronism with the projection of the picture, and by being able to readily observe the indicators from any angle he can at all times without delay perceive the footage of the film at any instance, so as to be sure, and to enable him to maintain the proper relation between the operation of the needle on the record and the running of the film through the machine.

Further features of invention reside in simple means whereby when the operating handle is released by the operator, the indicator will automatically swing back to a normal predetermined position.

A present preferred form of the invention is shown in the drawings of which:

Fig. 2 is an enlarged side elevation of the indicator;

Fig. 3 is a similar view in front elevation;

Fig. 4 is a plan view;

Fig. 5 is a vertical section on the line 5—5 of Fig. 6;

Fig. 6 is a vertical section taken on the line 6—6 of Fig. 5;

Fig. 7 is a horizontal section taken on the line 7—7 of Fig. 5;

Figure 1:
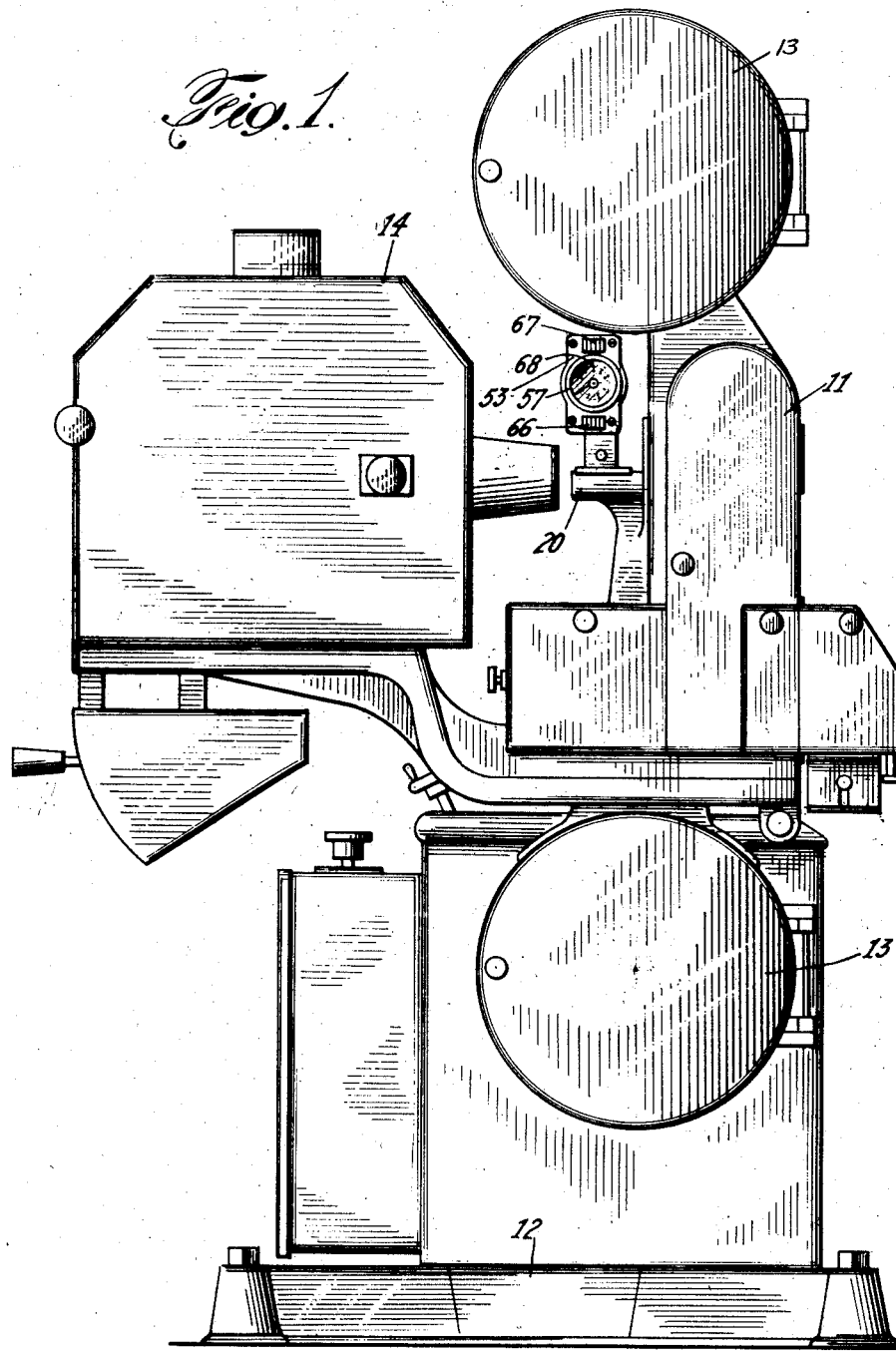
Fig. 1 is a side elevation of a projector showing the speed and footage indicator mounted thereon.

The present preferred form of the invention shown in the drawings is a film footage and speed indicator which is so disposed on the motion picture machine projector to readily indicate the speed and footage of the film and is so constructed and arranged to be readily observable by the operator from any position since the indicator is, by mere turning of the handle capable of being moved to be seen from any desired angle without interrupting its operation. This form of the invention, as shown, comprises a casing 10 adapted to be mounted on the head 11 of a picture projecting machine, such as shown in Fig. 1. This projector comprises a base 12, head 11, upper and lower magazines 13 and lamp house 14.

The casing 10 is provided with the usual indicating mechanism therein, of any suitable type, and has a dial 15 graduated in terms of footage and speed for more than one type of film, for instance grandeur or what is now known as wide film, and the regular film, so that when a machine is adapted mechanically to operate with either one or more of these films, the indicator will without change or alteration indicate the footage and speed of either type of film. A needle 16 is operated by the suitable mechanism within the casing and is adapted to swing over the graduations. The total number of feet of film passing through the machine is indicated for both types of film by suitable numerals in the openings 17 and 18, as shown.

Referring to Figs. 5, 6 and 7, particularly, it will be observed that a suitable drive shaft 19 extends into a bore in the hub 20. This hub projects preferably from the rear face of the head 11. In this bore are disposed spaced bearing sleeves 21 and 22 acting as suitable bearings for the shaft. These sleeves are held in position by engagement with grooves therein of screws such as 23 extending thereinto from a plate 24 disposed on top of the hub 20 and which these screws also hold in position. This plate 24 has an upwardly extending bored sleeve 25 thereon, preferably integral therewith, and through the top of this sleeve 25 a vertical shaft 26 extends, at the lower end of which is a gear 27 meshing with the worm gear 28 on the shaft 19. At the upper end of the shaft 26 is a ratchet gear 29 meshing with a worm gear 30 on shaft 31 disposed within the casing 10 and operating the usual or any other suitable indicator and footage mechanism. Spaced collars 32 and 33 are fastened to the shaft 26 respectively below the rear face of the casing and above the top of sleeve 25, so as to position the shaft 26, while permitting it to be rotated.

The outer upper surface of sleeve 25 is threaded as at 34 to receive lock nuts 35. At the lower end is disposed a washer 36 and beneath this is disposed a coil spring 37, the lower end of which is seated in a cup 38. This cup 38 is fastened to the upper surface of a base plate 39 bored to surround the lower end of sleeve 25 and to be slidably operated on the plate 24. This base plate 39 has a pedestal element 40 thereon, which extends upwardly and is connected to, and acts as a support for, the casing 10. This pedestal is provided with a handle 41. The upper end of the spring 37 is fastened to the washer 36 and the lower end to the cup 38. This spring has a normal condition of tension and when the handle 41 is turned from the normal position in one direction or another it places this spring under an additional condition of tension and when the handle is released the spring will return the indicator and its associated parts to the normal position shown in Fig. 5 which is, with the dial preferably facing to the rear of the projector. The enclosing housing 42 surrounding the spring and the lock nuts and fastening over the outside of the cup 38 has a central hole in its upper end to permit the passing therethrough of shaft 26.

It will be observed that the base plate 39 rotatable on plate 24 is turnable or rotatable around an axis coincident with that of shaft 26. Thus the indicator as a whole may be turned in one direction or another for observation without interfering in any way with the rotation of the shaft 26, driven by shaft 19. The device is simple and compact and composed of a minimum number of parts and enables the operator by the turning of a handle to turn the indicator from whatever position it may be in, to note the speed of the film and the footage thereof regardless of whether it is one type of film or another.

Figure 8:
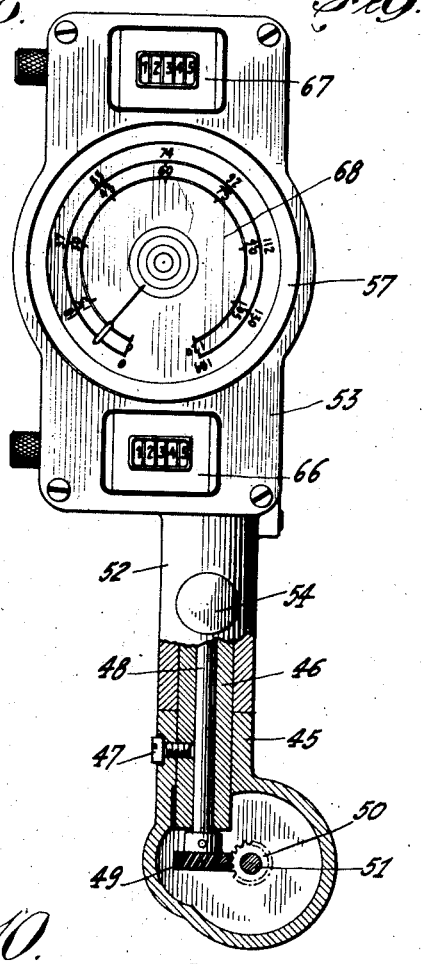
Fig. 8 is an elevation partly in section of a modified form of the device.
Figure 9:
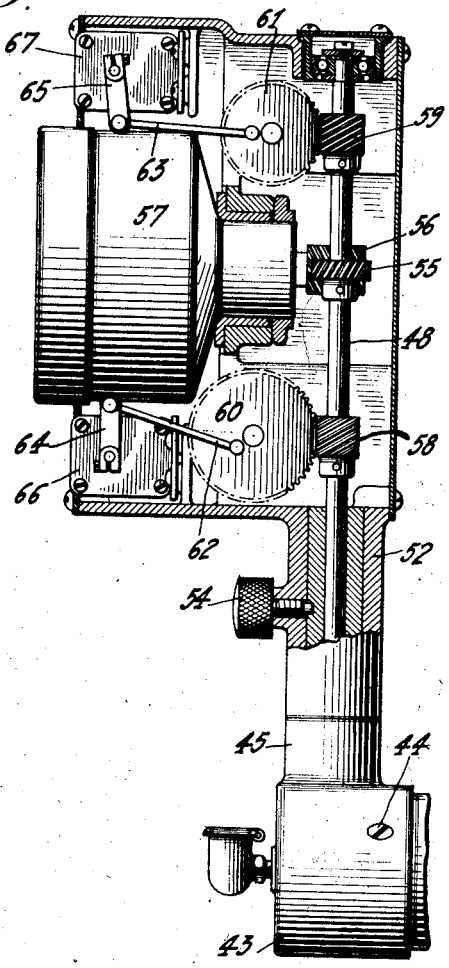
Fig. 9 is a vertical partial section therethrough.
Figure 10:
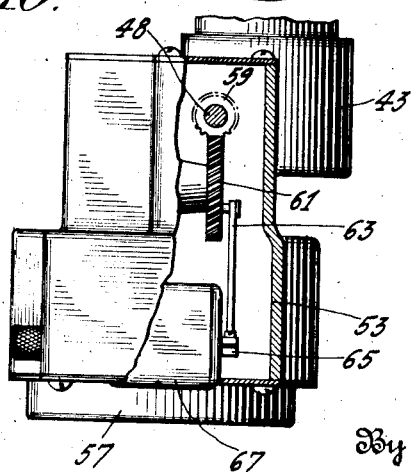
Fig. 10 is a plan view with portions broken away.

Referring to Figures 8, 9 and 10, a modified form of the invention is shown. In this form of the invention the frame of the machine is engaged by a collar 43 held thereon by a set screw 44. This collar has an upright sleeve 45 thereon. Within this sleeve there is disposed a bored rod 46 held in position in the collar by means of set screw 47 entering a hole therein. This bored rod acts as an elongated bearing for drive shaft 48 disposed therein. This drive shaft at its lower end is provided with a gear 49 meshing with a gear 50 on the shaft 51 connected to the main drive mechanism of the machine.

The elongated rod 46 also acts as a guide or bearing for a sleeve 52 dependent from the speedometer casing 53. A set screw 54 engaging with any one of several apertures in the sleeve 46 permits the sleeve 52 in the casing 53 to be moved around on the sleeve 46 to assume a plurality of positions as previously mentioned, so that the speedometer can be observed from a plurality of points around the machine.

The shaft 48 is provided with a worm 55 engaging a worm 56 on the drive shaft connected to the speedometer unit 57. This shaft is also provided with gears 58 and 59 meshing respectively with gears 60 and 61 disposed within the casing and connected respectively by links 62 and 63 with arms 64 and 65 connected to registers 66 and 67, which are adapted to indicate film footage for different kinds of film, such as the ordinary film and the grandeur film. The dial 68 of the speedometer unit 57 is calibrated in terms of speed of the film and has different scales calibrated for different kinds of film running through the machine. It is obvious that with a film having slightly larger picture sections, and with the need of running a definite number of picture sections per second past the opening, a greater footage of this film would pass in a given time, than with a film having smaller picture sections. Consequently there is the necessity for different scales and different registers. These are operated, however, from the one shaft in a simple, compact, efficient manner.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In combination with a motion picture apparatus, a film speed and footage indicator thereon, a dial on said indicator, a shaft extending from said indicator, a drive shaft disposed at an angle to said first mentioned shaft, gears on said shafts, said gears meshing with each other, the drive shaft being connected to a portion of the drive mechanism of the apparatus, a pedestal on which said indicator is supported, said pedestal mounted on the apparatus to swing around the axis of the drive shaft, and a handle on said pedestal to permit it to be swung to move the dial of the indicator to various positions.

2. In combination with a motion picture apparatus, a film speed and footage indicator thereon, with its dial disposed in a vertical plane, a shaft extending horizontally from said indicator, a vertically disposed drive shaft connecting with said first mentioned shaft, the drive shaft being connected to a portion of the drive mechanism of the apparatus, a pedestal on which said indicator is supported, mounted on the apparatus to swing around the axis of the drive shaft, and a handle on said pedestal to permit it to be swung to move the dial of the indicator to various positions, and means for restoring the indicator to a normal position when the handle is released.

3. In combination with a motion picture apparatus having a drive shaft disposed horizontally therein, a vertical connecting shaft engaging the drive shaft, a film speed and footage indicator, a shaft on said indicator engaging with said connecting drive shaft, a dial on said indicator disposed in a vertical plane, a pedestal supporting said indicator and adjustable on the apparatus around the axis of the connecting drive shaft, a handle on said pedestal to enable it to be adjusted and a spring disposed between the apparatus and the pedestal to restore the indicator to normal position when released.

4. In combination with a motion picture apparatus having a drive shaft disposed therein, a connecting shaft disposed at an angle to the drive shaft and engaging therewith, a film speed and footage indicator, a shaft on said indicator engaging with the connecting shaft, a dial on said indicator disposed in a predetermined plane, a pedestal supporting said indicator and adjustable on the apparatus around the axis of the connecting drive shaft, a handle on said pedestal to adjust it, and a spring disposed between the apparatus and the pedestal to restore the indicator to normal position when the pedestal is released from an abnormal position.

ALBERT KINDELMANN.
EWALD BOECKING.